(12) United States Patent
Chen (10) Patent No.: US 6,206,160 B1
(45) Date of Patent: Mar. 27, 2001

(54) RATCHET TRANSMISSION CONTROL MECHANISM FOR A RATCHETING TOOL

(76) Inventor: Tsai-Ching Chen, P.O. Box 63-247, Taichung (TW)

( * ) Notice: Subject to any disclaimer, the term of this patent is extended or adjusted under 35 U.S.C. 154(b) by 0 days.

(21) Appl. No.: 09/467,289

(22) Filed: Dec. 20, 1999

(51) Int. Cl.[7] .............................. B25B 15/04; F16D 41/08
(52) U.S. Cl. .............................. 192/43.2; 192/46; 81/63.1
(58) Field of Search .......................... 192/43, 43.1, 43.2, 192/46; 81/58, 60, 63.1

(56) References Cited

U.S. PATENT DOCUMENTS

| | | | |
|---|---|---|---|
| 2,395,681 | * | 2/1946 | Odlum et al. ........................ 192/43.2 |
| 2,565,961 | * | 8/1951 | Godfrey ................................. 192/43 |
| 2,649,176 | * | 8/1953 | Winger .................................. 192/43 |
| 4,735,120 | * | 4/1988 | Beugelsdyk ..................... 192/43.2 X |
| 5,573,093 | * | 11/1996 | Lee ...................................... 192/43.2 |
| 5,848,680 | * | 12/1998 | Rinner ................................ 192/43.1 |
| 5,988,337 | * | 11/1999 | Liu ..................................... 192/43.1 |
| 6,047,801 | * | 4/2000 | Liao ................................... 192/43.2 |

* cited by examiner

Primary Examiner—Charles A Marmor
Assistant Examiner—Saúl Rodriguez
(74) Attorney, Agent, or Firm—Alan Kamrath Rider Bennett Egan & Arundel, LLP.

(57) ABSTRACT

A ratchet transmission control mechanism includes a main body, a spindle rotatably mounted in a longitudinal hole in the main body, two pawls slidably mounted in two transverse holes in the main body, respectively, two elastic members respectively mounted in two arcuate channel devices defined in an outer periphery of the main body, and a switch cap mounted around the main body. The switch cap is movable between three positions, wherein when the switch cap is in a central position, the two pawls are respectively biased by the elastic members to engage with a toothed portion of the spindle, thereby allowing the spindle to drive a fastener in either direction. When the switch cap is moved to one of the other two positions, an operative member in the switch cap presses one of the elastic member and thus disengages a corresponding pawl from a toothed portion of the spindle while the other pawl remains engaged with the toothed portion of the spindle, thereby allowing the spindle to drive the fastener in only one direction.

8 Claims, 7 Drawing Sheets

RATCHET TRANSMISSION CONTROL MECHANISM FOR A RATCHETING TOOL

BACKGROUND OF THE INVENTION

1. Field of the Invention

The present invention relates to a ratchet transmission control mechanism for a ratcheting tool for driving fasteners.

2. Description of the Related Art

U.S. Pat. No. 5,573,093 to Lee issued on Nov. 12, 1996 discloses a ratchet transmission control mechanism of a screwdriver that includes a casing having a head at one end, toothed shaft inserted into an axial center hole on the head to hold a bit for turning screw, two stop blocks mounted in a respective slot on the head of the casing and retained in place by a clamp for engagement with the toothed portion o the toothed shaft, an adjusting cap mounted around the toothed shaft over the head of the casing and retained in place by a locating ring. When the adjusting cap is turned to the middle position, the two stop blocks are forced into engagement with the toothed portion of the shaft for permitting the shaft to be turned by the casing in both ways. When the adjusting cap is turned to the leftward position or the rightward position, only one stop block is forced into engagement with the toothed portion of the shaft, and the shaft can be turned by the casing in one direction.

It is, however, found that assembly procedure of such a ratchet transmission control mechanism is troublesome and time-consuming. In addition, each of the stop blocks is engaged with the toothed portion of the shaft by one tooth and thus has poor ratcheting effect.

The present invention is intended to provide an improved ratchet transmission control mechanism for a ratcheting tool that mitigates and/or obviate the above problems.

SUMMARY OF THE INVENTION

It is a primary object of the present invention to provide an improved ratchet transmission control mechanism for a ratcheting tool that can be assembled easily and quickly to thereby lower the assembly cost.

It is another object of the present invention to provide an improved ratchet transmission control mechanism for a ratcheting tool that provides reliable ratcheting effect by providing pawls having more teeth for engaging with the toothed portion of the spindle of the ratcheting tool.

In accordance with the present invention, a ratchet transmission control mechanism for a ratcheting tool with a handle comprises:

a cylindrical main body from which the handle of the ratcheting tool extends, the cylindrical main body including a longitudinal hole and a first transverse hole and a second transverse hole that are communicated with the longitudinal hole, the main body further including a groove, two first transverse receptacles, and two second transverse receptacles in an outer periphery thereof;

a pair of parallel first arcuate channels defined in the outer periphery of the main body and each including a first end that terminates in an associated said first transverse receptacle and a second end that is communicated with the groove of the main body;

a pair of parallel second arcuate channels defined in the outer periphery of the main body and each including a first end that terminates in an associated said second transverse receptacle and a second end that is communicated with the groove of the main body;

a spindle rotatably received in the longitudinal hole of the main body and including an end extended beyond the main body for driving a fastener, the spindle including a toothed portion disposed in the longitudinal hole of the main body;

a substantially U-shape first elastic member including two limbs and a connecting section interconnecting between the limbs, each said limb of the first elastic member having a distal end, the limbs of the first elastic member being mounted in the first channels with the distal ends of the first elastic member securely, respectively retained in the first transverse receptacles and with the connecting section of the first elastic member extended into the groove;

a substantially U-shape second elastic member including two limbs and a connecting section interconnecting between the limbs, each said limb of the second elastic member having a distal end, the limbs of the second elastic member being mounted in the second channels with the distal ends of the second elastic member securely, respectively retained in the second transverse receptacles and with the connecting section of the second elastic member extended into the groove;

a first pawl mounted in the first transverse hole of the main body, the limbs of the first elastic member being extended through the first pawl such that the first pawl is biased radially inward by the first elastic member to engage with the toothed portion of the spindle and that the first pawl is biased radially outward by the first elastic member when the connecting section of the first arcuate elastic member is pressed toward the distal ends of the first elastic member;

a second pawl mounted in the second transverse hole of the main body, the limbs of the second elastic member being extended through the second pawl such that the second pawl is biased radially inward by the second elastic member to engage with the toothed portion of the spindle and that the second pawl is biased radially outward by the second elastic member when the connecting section of the second arcuate elastic member is pressed toward the distal ends of the second elastic member;

a hollow switch cap mounted around the main body, the switch cap including an operative member projected from an inner periphery and movable among three positions upon turning the switch cap, wherein when the operative member is in a first of the three positions, the operative member presses against the connecting section of the first elastic member such that the first pawl is disengaged from the toothed portion of the spindle while the second pawl is engaged with the toothed portion of the spindle, thereby allowing the spindle to drive a fastener along a first direction, when the operative member is in a third of the three positions, the operative member presses against the connecting section of the second elastic member such that the second pawl is disengaged from the toothed portion of the spindle while the first pawl is engaged with the toothed portion of the spindle, thereby allowing the spindle to drive the fastener along a second direction opposite to the first direction, when the operative member is in a second of the three positions, neither the connecting section of the first elastic member nor the connecting section of the second elastic member is pressed by the operative member such that the first pawl and the second pawl are both engaged with the toothed portion of the spindle, thereby allowing the spindle to drive the fastener along either the first direction or the second direction; and means for retaining the switch cap in the three positions and allowing the operative member of the switch cap to be moved to one of the three positions upon rotation of the switch cap.

In a preferred embodiment of the invention, the means for retaining the switch cap includes a transverse blind hole defined in the outer periphery of the main body. The switch cap includes three retaining depressions in the inner periphery thereof. A spring is received in the transverse blind hole, and a ball is received in the transverse blind hole and biased radially outward by the spring to be selectively retained in one of the three retaining depressions.

The outer periphery of the main body includes a guiding groove, and the switch cap includes a pinhole that is communicated with the guiding groove of the main body. A pin is extended through the pinhole. The pin has an end slidably guided in the guiding groove of the main body, thereby securely mounting the switch cap to the main body yet allowing the switch cap to rotate about the main body.

The inner periphery of the switch cap includes a first cavity for receiving a portion of the limbs of the first elastic member that is moved radially outward when the connecting section of the first elastic member is pressed by the operative member of the switch cap. The inner periphery of the switch cap further includes a second cavity for receiving a portion of the limbs of the second elastic member that is moved radially outward when the connecting section of the second elastic member is pressed by the operative member of the switch cap.

The first pawl includes an upper engaging groove in an upper side thereof for engaging with one of the limbs of the first elastic member. The first pawl further includes a lower engaging groove in an underside thereof for engaging with the other limb of the first elastic member. The second pawl includes an upper engaging groove in an upper side thereof for engaging with one of the limbs of the second elastic member. The second pawl further includes a lower engaging groove in an underside thereof for engaging with the other limb of the second elastic member.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
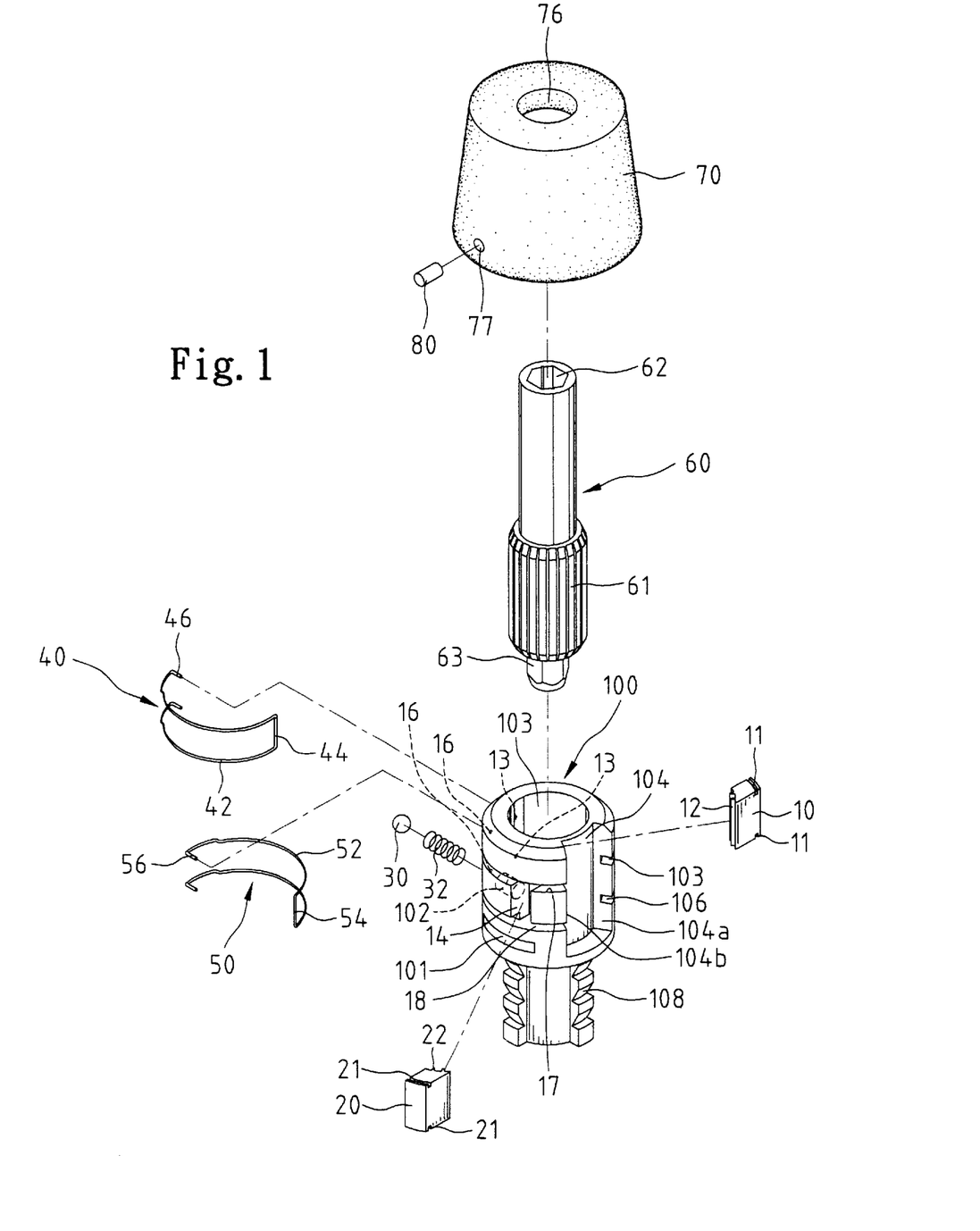
FIG. 1 is an exploded perspective view of a ratcheting tool with a ratchet transmission control mechanism in accordance with the present invention.
Figure 2:
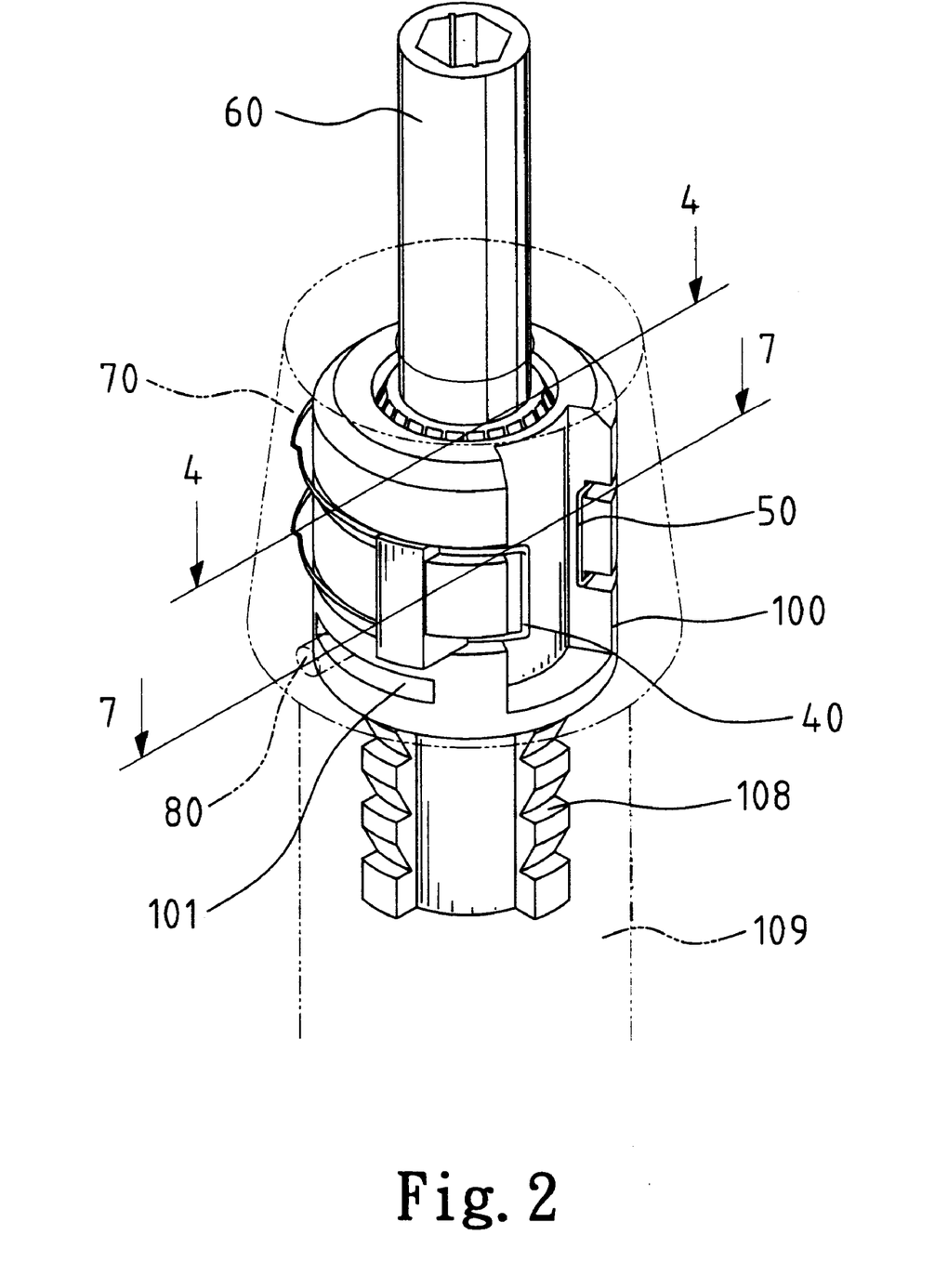
FIG. 2 is perspective view of the ratcheting tool in accordance with the present invention.

Referring to FIGS. 1 and 2, a ratcheting tool with a ratchet transmission control mechanism in accordance with the present invention generally includes a cylindrical main body 100 with an extension 108 for securely engaging with a handle 109 (FIG. 2). The handle 109 may be formed on the extension 108 by means of plastic injection molding. The main body 100 is preferably made of metal and includes a longitudinal hole 103. The main body 100 further includes two transverse holes 14 (see FIGS. 1 and 4) communicated with the longitudinal hole 103. The outer periphery of the main body 100 further includes a transverse blind hole 102 for receiving a retaining means. In this embodiment, the retaining means includes a ball 30 and an elastic member 32 (e.g., a coil spring) for biasing the ball 30 radially outward, which will be described.

Figure 4:
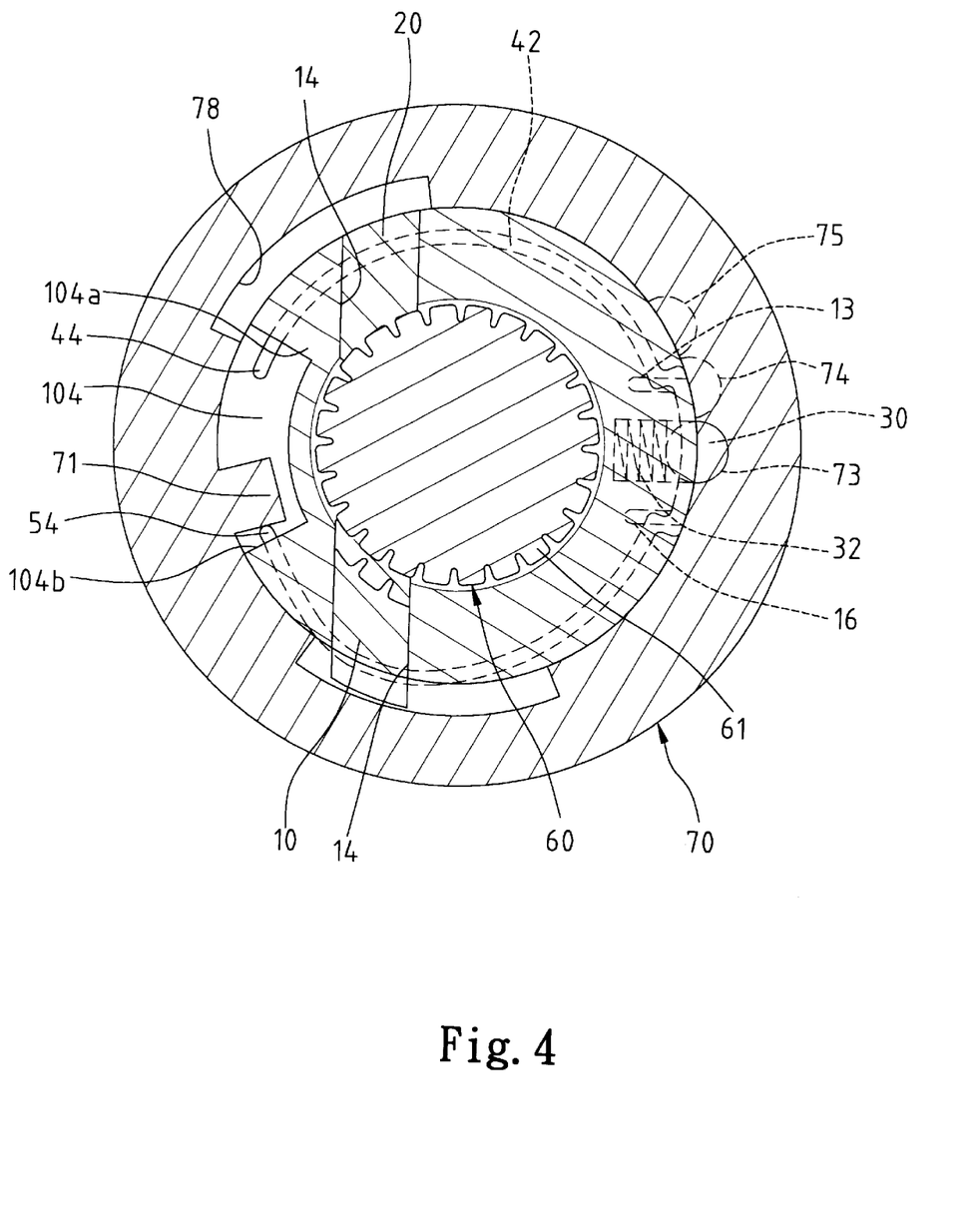
FIG. 4 is a sectional view taken along line 4—4 in FIG. 2, wherein a first pawl is engaged with the toothed portion of the spindle of the ratcheting tool and a second pawl is disengaged from the toothed portion of the spindle.

Still referring to FIGS. 1 and 4, a groove 104 is defined in an outer periphery of the main body 100. The outer periphery of the main body 100 further includes a first arcuate channel means and a second channel means. In this embodiment, the first channel means includes a pair of parallel channels 106 and 107 each having a first end terminated in a transverse receptacle 16 defined in the outer periphery of the main body 100 and a second end communicated with the groove 104 of the main body 100. It is noted that the channels 106 and 107 have intersection with the transverse hole 14 for receiving the first pawl 10. Similarly, the second channel means includes a pair of parallel channels 17 and 18 each having a first end terminated in a transverse receptacle 13 defined in the outer periphery of the main body 100 and a second end communicated with the groove 104 of the main body 100. It is noted that the channels 17 and 18 have intersection with the transverse hole 14 for receiving the second pawl 20.

A spindle 60 is rotatably received in the longitudinal hole 103 of the main body 100 and includes a first end 63 rotatably held in the main body 100 or the extension 108 and a second end 62 extended beyond the main body 100. The second end 62 of the spindle 60 is in the form of a chuck for receiving a screwdriver bit (not shown). Alternatively, the second end 62 of the spindle 60 may be in the form of a driver member for a hexagonal fastener such as a bolt head or nuts. A toothed portion 61 is formed on an outer periphery of the spindle 60 between the first end 63 and the second end 62.

A first pawl 10 is received in one of the transverse hole 14 and a second pawl 20 is received in the other transverse hole 14. Both of the first pawl 10 and the second pawl 20 are slidable in a radial direction in the transverse holes 14, respectively, which will be described later. Each pawl 10, 20 includes an inner side (not labeled) having a plurality of teeth 12, 22 (although the embodiment shows only two teeth). Each pawl 10, 20 further includes an engaging groove 21 in each of an upper side and an underside thereof, best shown in FIG. 1.

A first elastic member 50 is mounted in the first channel means. In this embodiment, the first elastic member 50 includes a substantially U-shape member having two limbs 52 and a connecting section 54 interconnecting the limbs 52, each limb 52 having a distal end 56. In assembly, the limbs 52 of the first elastic member 50 are mounted in the channels 106 and 107 with the distal ends 56 inserted into the receptacles 16 and with the connection section 54 extended into the groove 104. It is noted that the limbs 52 of the first elastic member 50 are extended through and thus engaged in the engaging grooves 11 of the first pawl 10.

A second elastic member 40 is mounted in the second channel means. Similar to the first elastic member 50, the second elastic member 40 includes a substantially U-shape member having two limbs 42 and a connecting section 44 interconnecting the limbs 42, each limb 42 having a distal end 46. In assembly, the limbs 42 of the second elastic member 40 are mounted in the channels 17 and 18 with the distal ends 46 inserted into the receptacles 13 and with the connection section 44 extended into the groove 104. It is noted that the limbs 42 of the second elastic member 40 are extended through and thus retained in the engaging grooves 21 of the second pawl 20.

Figure 3:
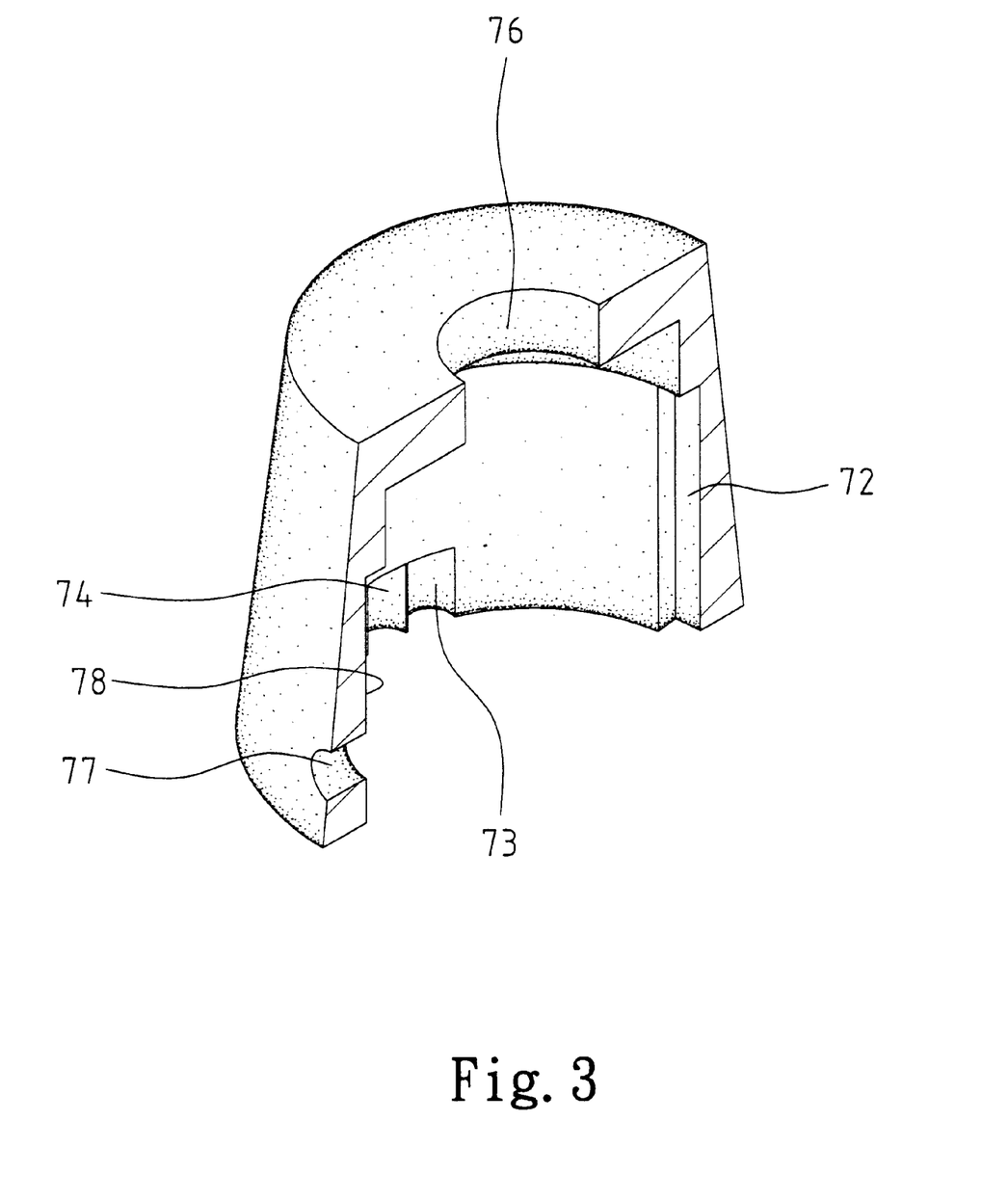
FIG. 3 is a perspective view, partly cutaway, of a switch cap of the ratcheting tool in accordance with the present invention.
Figure 7:
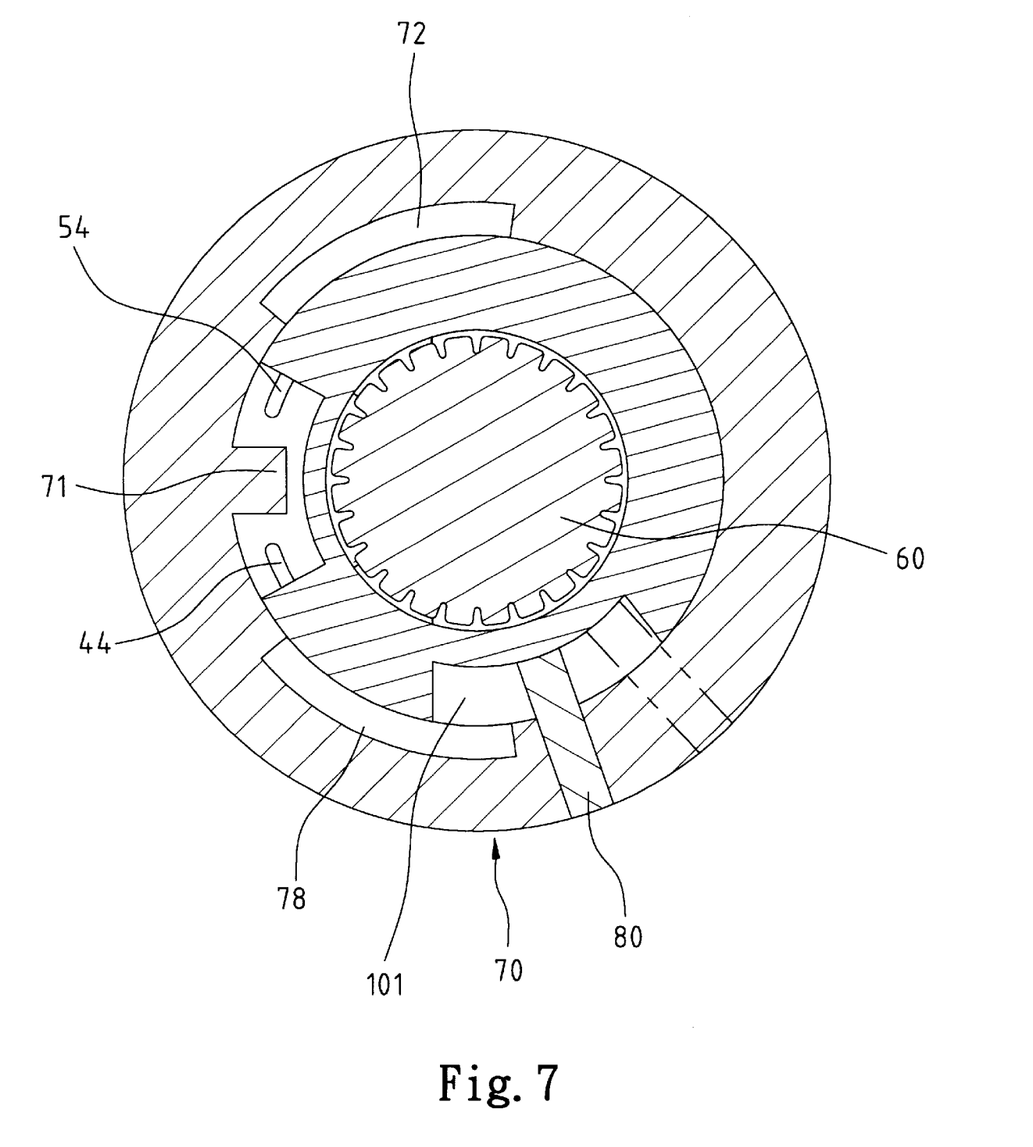
FIG. 7 is a sectional view taken along line 7—7 in FIG. 2.

A switch cap 70 is rotatably mounted around the main body 100 for changing engaging status between the pawls 10 and 20 and the toothed portion 61 of the spindle 60. The switch cap 70 is hollow and includes an opening 76 on an end face thereof through which the second end 62 of the spindle 60 is extended beyond the switch cap 70. Referring to FIGS. 1, 3, and 4, the switch cap 70 includes a first cavity 72 and a second cavity 78 in an inner periphery thereof. The inner periphery of the switch cap 70 further includes three retaining depressions 73, 74, and 75 for receiving and retaining the ball 30 biased by the spring 32. It is noted that the first cavity 72 faces the first channel means and the second cavity 78 faces the second channel means. The outer periphery of the switch cap 70 further includes a transverse pinhole 77 through which a pin 80 is extended. An inner end of the pin 80 is extended into and slidable along a guiding groove 101 (see FIGS. 1 and 7) defined in the outer periphery of main body 100 such that the switch cap 70 is securely yet rotatably mounted around the main body 100. The switch cap 70 further includes an operative member 71 projected from the inner periphery thereof and extended into the groove 104 of the main body 100.

The ratcheting tool in FIG. 4 is in a status allowing counterclockwise ratcheting and clockwise free rotation. The switch cap 70 is turned to a position in which the operative member 71 presses against the connecting section 44 of the second elastic member 40 until the connecting section 44 bears against a side wall 104b defining the groove 100. As a result, mediate portions of the limbs 42 of the second elastic member 40 are bent and moved radially outward into the cavity 78. The second pawl 20 is thus moved radially outward, as the limbs 42 of the second elastic member 40 are engaged in the engaging grooves 21 of the second pawl 20 and the distal ends 46 of the limbs 42 of the second elastic member 40 are fixed in the transverse receptacles 13. Thus, the teeth 12 of the second pawl 20 are disengaged from the toothed portion 61 of the spindle 60 of the ratcheting tool. The first pawl 10 is engaged with the toothed portion 61 of the spindle 60 under the action of the first elastic member 50. Namely, the first elastic member 50 biases the first pawl 10 radially inward to engage with the toothed portion 61 of the spindle 60. It is noted that the switch cap 70 is retained in this position, as the ball 30 is biased by the spring 32 to move radially outward so as to be partially received and thus retained in retaining depression 73.

Figure 5:
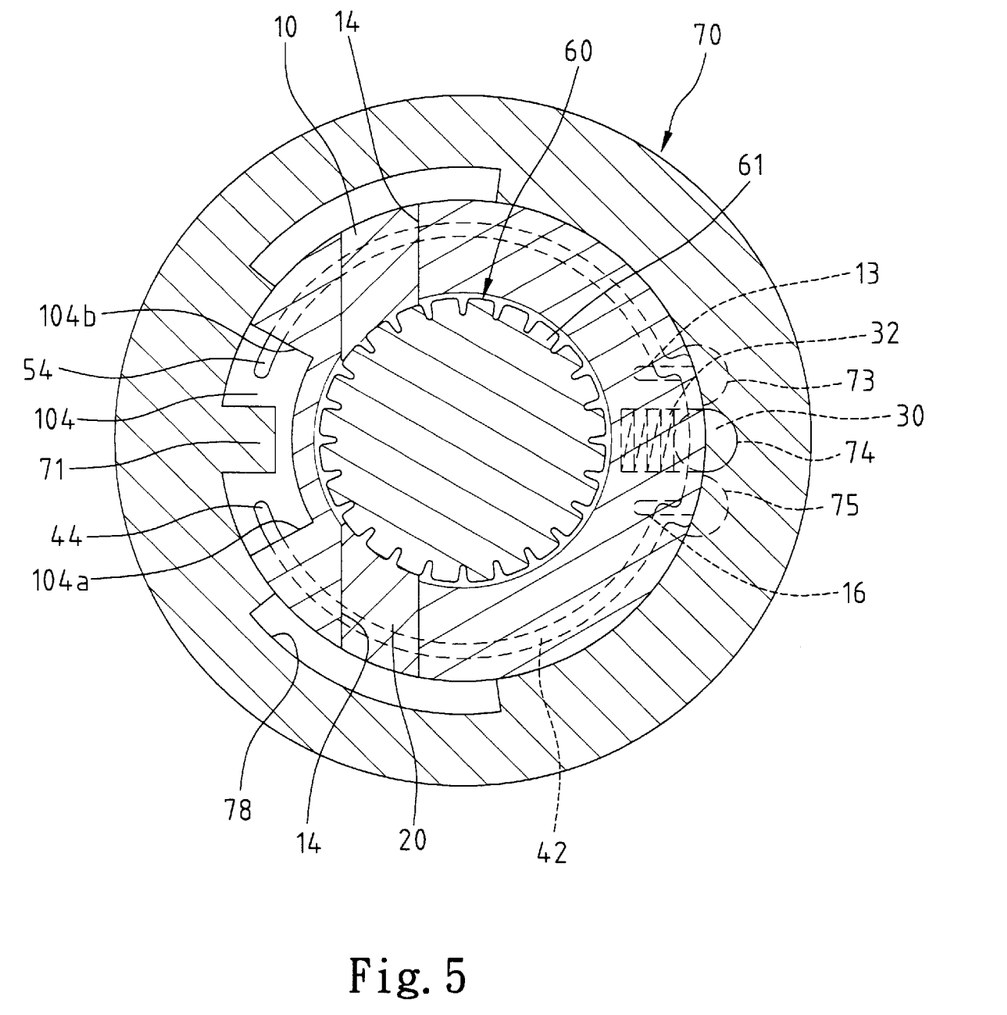
FIG. 5 is a sectional view similar to FIG. 4, wherein both of the first pawl and the second pawl are engaged with the toothed portion of the spindle.

When the switch cap 70 is rotated relative to the main body 100 to a position shown in FIG. 5, both the first pawl 10 and the second pawl 20 are engaged with the toothed portion 61 of the spindle 60 under the action of the elastic members 50 and 40, as the operative member 71 is in a position not engaging with any one of the elastic members 50 and 40. The ratcheting tool in FIG. 5 is in a status allowing counterclockwise and clockwise ratcheting without free rotation. It is noted that the switch cap 70 is retained in this position, as the ball 30 is biased by the spring 32 to move radially outward so as to be partially received and thus retained in retaining depression 74.

Figure 6:
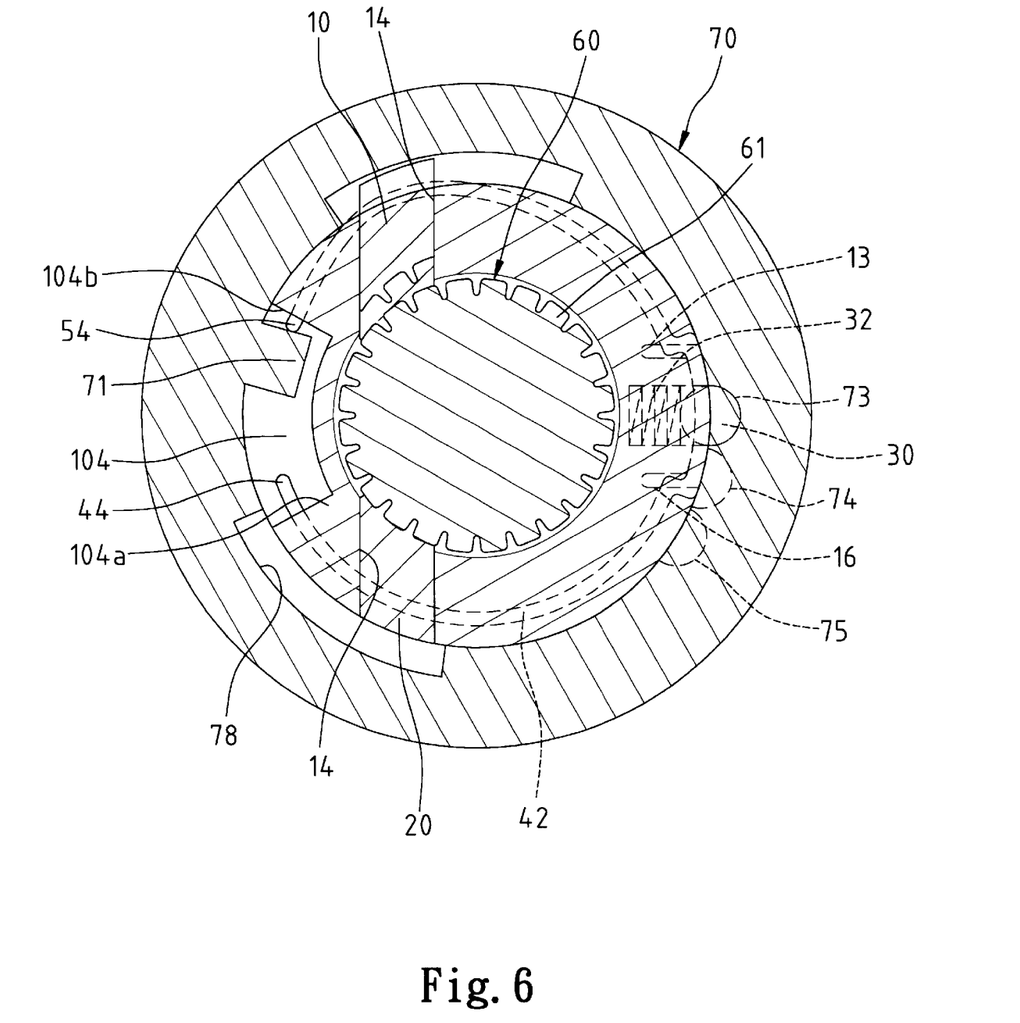
FIG. 6 is a sectional view similar to FIG. 4, wherein the second first pawl is engaged with the toothed portion of the spindle and the first pawl is disengaged from the toothed portion of the spindle.

When the switch cap 70 is rotated relative to the main body 100 to a position shown in FIG. 6, the ratcheting tool is in a status allowing clockwise ratcheting and counterclockwise free rotation. More specifically, the switch cap 70 is turned to a position in which the operative member 71 presses against the connecting section 54 of the first elastic member 50 until the connecting section 54 bears against the other side wall 104a defining the groove 100. As a result, such that mediate portions of the limbs 52 of the first elastic member 50 are bent and moved radially outward into the cavity 72. The first pawl 10 is thus moved radially outward, as the limbs 52 of the first elastic member 50 are engaged in the engaging grooves 11 of the first pawl 10 and the distal ends 56 of the limbs 52 of the first elastic member 50 are fixed in the transverse receptacle 16. Thus, the teeth 12 of the first pawl 50 are engaged with the toothed portion 61 of the spindle 60 of the ratcheting tool. The second pawl 20 is engaged with the toothed portion 61 of the spindle 60 under the action of the second elastic member 40. It is noted that the switch cap 70 is retained in this position, as the ball 30 is biased by the spring 32 to move radially outward so as to be partially received and thus retained in retaining depression 75.

It is appreciated that assembly of the ratchet transmission control mechanism for a ratcheting tool in accordance with the present invention can be accomplished easily and quickly to thereby lower the assembly cost. In addition, the ratchet transmission control mechanism for a ratcheting tool in accordance with the present invention provide reliable ratcheting effect by providing pawls having more teeth for engaging with the toothed portion 61 of the spindle of the ratcheting tool.

Although the invention has been explained in relation to its preferred embodiment, it is to be understood that many other possible modifications and variations can be made without departing from the spirit and scope of the invention as hereinafter claimed.

What is claimed is:

1. A ratchet transmission control mechanism for a ratcheting tool with a handle, comprising:

a cylindrical main body from which the handle of the ratcheting tool extends, the cylindrical main body including a longitudinal hole and a first transverse hole and a second transverse hole that are communicated with the longitudinal hole, the main body further including a groove, two first transverse receptacles, and two second transverse receptacles in an outer periphery thereof;

a pair of parallel first arcuate channels defined in the outer periphery of the main body and each including a first end that terminates in an associated said first transverse receptacle and a second end that is communicated with the groove of the main body;

a pair of parallel second arcuate channels defined in the outer periphery of the main body and each including a first end that terminates in an associated said second transverse receptacle and a second end that is communicated with the groove of the main body;

a spindle rotatably received in the longitudinal hole of the main body and including an end extended beyond the main body for driving a fastener, the spindle including a toothed portion disposed in the longitudinal hole of the main body;

a substantially U-shape first elastic member including two limbs and a connecting section interconnecting between the limbs, each said limb of the first elastic member having a distal end, the limbs of the first elastic member being mounted in the first channels with the distal ends of the first elastic member securely, respectively retained in the first transverse receptacles and with the connecting section of the first elastic member extended into the groove;

a substantially U-shape second elastic member including two limbs and a connecting section interconnecting between the limbs, each said limb of the second elastic member having a distal end, the limbs of the second elastic member being mounted in the second channels with the distal ends of the second elastic member securely, respectively retained in the second transverse receptacles and with the connecting section of the second elastic member extended into the groove;

a first pawl mounted in the first transverse hole of the main body, the limbs of the first elastic member being extended through the first pawl such that the first pawl is biased radially inward by the first elastic member to engage with the toothed portion of the spindle and that the first pawl is biased radially outward by the first elastic member when the connecting section of the first arcuate elastic member is pressed toward the distal ends of the first elastic member;

a second pawl mounted in the second transverse hole of the main body, the limbs of the second elastic member being extended through the second pawl such that the second pawl is biased radially inward by the second elastic member to engage with the toothed portion of the spindle and that the second pawl is biased radially outward by the second elastic member when the connecting section of the second arcuate elastic member is pressed toward the distal ends of the second elastic member;

a hollow switch cap mounted around the main body, the switch cap including an operative member projected from an inner periphery and movable among three positions upon turning the switch cap, wherein when the operative member is in a first of the three positions, the operative member presses against the connecting section of the first elastic member such that the first pawl is disengaged from the toothed portion of the spindle while the second pawl is engaged with the toothed portion of the spindle, thereby allowing the spindle to drive a fastener along a first direction, when the operative member is in a third of the three positions, the operative member presses against the connecting section of the second elastic member such that the second pawl is disengaged from the toothed portion of the spindle while the first pawl is engaged with the toothed portion of the spindle, thereby allowing the spindle to drive the fastener along a second direction opposite to the first direction, when the operative member is in a second of the three positions, neither the connecting section of the first elastic member nor the connecting section of the second elastic member is pressed by the operative member such that the first pawl and the second pawl are both engaged with the toothed portion of the spindle, thereby allowing the spindle to drive the fastener along either the first direction or the second direction; and means for retaining the switch cap in the three positions and allowing the operative member of the switch cap to be moved to one of the three positions upon rotation of the switch cap.

2. The ratchet transmission control mechanism as claimed in claim 1, wherein the means for retaining the switch cap includes a transverse blind hole defined in the outer periphery of the main body, the switch cap including three retaining depressions in the inner periphery thereof, a spring being received in the transverse blind hole, and a ball received in the transverse blind hole and biased radially outward by the spring to be selectively retained in one of the three retaining depressions.

3. The ratchet transmission control mechanism as claimed in claim 1, wherein the outer periphery of the main body includes a guiding groove, and wherein the switch cap includes a pinhole that is communicated with the guiding groove of the main body, further comprising a pin extended through the pinhole, the pin having an end slidably guided in the guiding groove of the main body, thereby securely mounting the switch cap to the main body yet allowing the switch cap to rotate about the main body.

4. The ratchet transmission control mechanism as claimed in claim 1, wherein the inner periphery of the switch cap includes a cavity for receiving a portion of the limbs of the first elastic member that is moved radially outward when the connecting section of the first elastic member is pressed by the operative member of the switch cap.

5. The ratchet transmission control mechanism as claimed in claim 1, wherein the inner periphery of the switch cap includes a cavity for receiving a portion of the limbs of the second elastic member that is moved radially outward when the connecting section of the second elastic member is pressed by the operative member of the switch cap.

6. The ratchet transmission control mechanism as claimed in claim 1, wherein the inner periphery of the switch cap includes a first cavity for receiving a portion of the limbs of the first elastic member that is moved radially outward when the connecting section of the first elastic member is pressed by the operative member of the switch cap, and wherein the inner periphery of the switch cap includes a second cavity for receiving a portion of the limbs of the second elastic member that is moved radially outward when the connecting section of the second elastic member is pressed by the operative member of the switch cap.

7. The ratchet transmission control mechanism as claimed in claim 1, wherein the first pawl includes an upper engaging groove in an upper side thereof for engaging with one of the limbs of the first elastic member, the first pawl further including a lower engaging groove in an underside thereof for engaging with the other limb of the first elastic member.

8. The ratchet transmission control mechanism as claimed in claim 1, wherein the second pawl includes an upper engaging groove in an upper side thereof for engaging with one of the limbs of the second elastic member, the second pawl further including a lower engaging groove in an underside thereof for engaging with the other limb of the second elastic member.

* * * * *